(12) United States Patent
Bettger et al.

(10) Patent No.: US 8,512,830 B2
(45) Date of Patent: *Aug. 20, 2013

(54) FILAMENT-STRUNG STAND-OFF ELEMENTS FOR MAINTAINING PANE SEPARATION IN VACUUM INSULATING GLAZING UNITS

(75) Inventors: Kenneth J. Bettger, Pella, IA (US); David H. Stark, Evergreen, CO (US)

(73) Assignee: Eversealed Windows, Inc., Evergreen, CO (US)

( * ) Notice: Subject to any disclaimer, the term of this patent is extended or adjusted under 35 U.S.C. 154(b) by 727 days.

This patent is subject to a terminal disclaimer.

(21) Appl. No.: 12/688,853

(22) Filed: Jan. 15, 2010

(65) Prior Publication Data
US 2010/0175347 A1    Jul. 15, 2010

Related U.S. Application Data

(60) Provisional application No. 61/145,093, filed on Jan. 15, 2009.

(51) Int. Cl.
*E04C 2/54* (2006.01)
(52) U.S. Cl.
USPC .......................... 428/34; 52/786.1; 52/786.11
(58) Field of Classification Search
USPC ................. 428/34; 52/786.1, 786.11, 786.13
See application file for complete search history.

(56) References Cited

U.S. PATENT DOCUMENTS

| | | |
|---|---|---|
| 49,167 A | 8/1865 | Stetson |
| 988,308 A | 4/1911 | Campbell |
| 1,004,257 A | 9/1911 | Higbee |

(Continued)

FOREIGN PATENT DOCUMENTS

| | | |
|---|---|---|
| EP | 0240584 A | 10/1987 |
| EP | 0983974 A1 | 3/2000 |

(Continued)

OTHER PUBLICATIONS

PCT: International Search Report and Written Opinion of PCT/US2010/021287 (counterpart application); Sep. 3, 2010; 8 pgs.

(Continued)

*Primary Examiner* — Donald J Loney
(74) *Attorney, Agent, or Firm* — Howison & Arnott, L.L.P.

(57) ABSTRACT

A vacuum insulating glazing unit (VIGU) comprises first and second panes of transparent material, first and second anchors, a plurality of filaments, a plurality of stand-off elements, and seals. The first and second panes of transparent material have edges and inner and outer faces, are disposed with their inner faces substantially opposing one another, and are separated by a gap having a predetermined height. The first and second anchors are disposed at opposite edges of one pane of the VIGU. Each filament is attached at one end to the first anchor and at the other end to the second anchor, and the filaments are collectively disposed between the panes substantially parallel to one another. The stand-off elements are affixed to each filament at predetermined positions along the filament, and have a height substantially equal to the predetermined height of the gap such that the each stand-off element touches the inner surfaces of both panes. The seals are disposed about the edges of the panes, enclosing the stand-off elements within a volume between the panes from which the atmosphere may be evacuated to form a partial vacuum.

7 Claims, 10 Drawing Sheets

(56) References Cited

U.S. PATENT DOCUMENTS

| | | |
|---|---|---|
| 1,127,381 A | 2/1915 | Byrnes |
| 1,388,126 A | 8/1921 | Rohland |
| 1,436,197 A | 11/1922 | Rohland |
| 1,560,690 A | 11/1925 | Housekeeper |
| 2,011,557 A | 8/1935 | Anderegg |
| 2,057,969 A | 8/1935 | Payson et al. |
| 2,119,009 A | 5/1938 | Elias |
| 2,177,001 A | 10/1939 | Owen |
| 2,206,558 A | 7/1940 | Bennet |
| 2,220,690 A | 11/1940 | Stupakoff |
| 2,625,717 A | 1/1953 | Wampler et al. |
| 2,708,774 A | 5/1955 | Seelen |
| 2,730,987 A | 1/1956 | Nelson |
| 2,756,467 A | 7/1956 | Etling |
| 3,232,732 A | 2/1966 | Wax |
| 3,389,522 A | 6/1968 | Hordis |
| 3,698,878 A | 10/1972 | Hale et al. |
| 3,778,127 A | 12/1973 | Langston |
| 3,778,244 A | 12/1973 | Nedelec |
| 3,808,115 A | 4/1974 | Manion |
| 3,828,960 A | 8/1974 | Walles |
| 3,865,567 A | 2/1975 | Klomp |
| 3,901,997 A | 8/1975 | Groth |
| 3,902,883 A | 9/1975 | Bayer |
| 3,922,705 A | 11/1975 | Yerman |
| 3,940,898 A | 3/1976 | Kaufman |
| 3,971,178 A | 7/1976 | Mazzoni |
| 3,979,668 A | 9/1976 | Samulowitz |
| 3,990,201 A | 11/1976 | Falbel |
| 4,016,644 A | 4/1977 | Kurtz |
| 4,035,539 A | 7/1977 | Luboshez |
| 4,047,351 A | 9/1977 | Derner |
| 4,060,660 A | 11/1977 | Carlson |
| 4,063,271 A | 12/1977 | Bean et al. |
| 4,089,143 A | 5/1978 | LaPietra |
| 4,099,082 A | 7/1978 | Chodil et al. |
| 4,132,218 A | 1/1979 | Bennet |
| 4,186,725 A | 2/1980 | Schwartz |
| 4,204,015 A | 5/1980 | Wardlaw et al. |
| 4,261,086 A | 4/1981 | Giachino et al. |
| 4,274,936 A | 6/1981 | Love |
| 4,303,732 A | 12/1981 | Torobin |
| 4,355,323 A | 10/1982 | Kock |
| 4,357,187 A | 11/1982 | Stanley |
| 4,427,123 A | 1/1984 | Komeda et al. |
| 4,444,821 A | 4/1984 | Young |
| 4,468,423 A | 8/1984 | Hall |
| 4,486,482 A | 12/1984 | Kobayashi |
| 4,531,511 A | 7/1985 | Hochberg |
| 4,547,432 A | 10/1985 | Pitts |
| 4,649,085 A | 3/1987 | Landram |
| 4,683,154 A | 7/1987 | Benson |
| 4,687,687 A | 8/1987 | Terneu |
| 4,737,475 A | 4/1988 | Thomas |
| 4,780,164 A | 10/1988 | Ruckheim |
| 4,798,695 A | 1/1989 | Redel |
| 4,928,448 A | 5/1990 | Phillip |
| 5,005,557 A | 4/1991 | Bachli |
| 5,009,218 A | 4/1991 | Bachli |
| 5,014,466 A | 5/1991 | Winner |
| 5,017,252 A | 5/1991 | Aldrich |
| 5,032,439 A | 7/1991 | Glicksman |
| 5,085,926 A | 2/1992 | Iida |
| 5,086,729 A | 2/1992 | Katagiri |
| 5,107,649 A | 4/1992 | Benson |
| 5,115,299 A | 5/1992 | Wright |
| 5,115,612 A | 5/1992 | Newton et al. |
| 5,118,924 A | 6/1992 | Mehra et al. |
| 5,124,185 A | 6/1992 | Kerr |
| 5,157,893 A | 10/1992 | Benson et al. |
| 5,175,975 A | 1/1993 | Benson et al. |
| 5,227,206 A | 7/1993 | Bachli |
| 5,270,084 A | 12/1993 | Parker |
| 5,302,414 A | 4/1994 | Alkhimov et al. |
| 5,330,816 A | 7/1994 | Rusek |
| 5,370,913 A | 12/1994 | Lin |
| 5,378,527 A | 1/1995 | Nakanishi |
| 5,423,119 A | 6/1995 | Yang |
| 5,433,056 A | 7/1995 | Benson |
| 5,489,321 A | 2/1996 | Benson |
| 5,508,092 A | 4/1996 | Kimock |
| 5,525,430 A | 6/1996 | Chahroudi |
| 5,582,866 A | 12/1996 | White |
| 5,589,239 A | 12/1996 | Tomono et al. |
| 5,610,431 A | 3/1997 | Martin |
| 5,625,222 A | 4/1997 | Yoneda et al. |
| 5,643,644 A | 7/1997 | Demars |
| 5,657,607 A | 8/1997 | Collins et al. |
| 5,719,979 A | 2/1998 | Furuyama |
| 5,778,629 A | 7/1998 | Howes |
| 5,789,857 A | 8/1998 | Yamaura |
| 5,811,926 A | 9/1998 | Novich |
| 5,834,891 A * | 11/1998 | Novich ..................... 313/495 |
| 5,846,638 A | 12/1998 | Meissner |
| 5,855,638 A | 1/1999 | Demars |
| 5,856,914 A | 1/1999 | O'Boyle |
| 5,891,536 A | 4/1999 | Collins |
| 5,897,927 A | 4/1999 | Tsai |
| 5,902,652 A | 5/1999 | Collins et al. |
| 5,920,463 A | 7/1999 | Thomas et al. |
| 5,937,611 A | 8/1999 | Howes |
| 5,945,721 A | 8/1999 | Tatoh |
| 5,949,655 A | 9/1999 | Glenn |
| 5,950,398 A | 9/1999 | Hubbard |
| 5,982,010 A | 11/1999 | Namba et al. |
| 5,983,593 A | 11/1999 | Carbary et al. |
| 6,007,397 A | 12/1999 | Ju |
| 6,020,628 A | 2/2000 | Mravic et al. |
| 6,052,965 A | 4/2000 | Florentin |
| 6,054,195 A | 4/2000 | Collins |
| 6,071,575 A | 6/2000 | Collins |
| 6,083,578 A | 7/2000 | Collins |
| 6,101,783 A | 8/2000 | Howes |
| 6,114,804 A | 9/2000 | Kawase |
| 6,131,410 A | 10/2000 | Swierkowski |
| 6,139,913 A | 10/2000 | Van Steenkiste et al. |
| 6,141,925 A | 11/2000 | Halvorson, Jr. et al. |
| 6,168,040 B1 | 1/2001 | Sautner et al. |
| 6,191,359 B1 | 2/2001 | Sengupta et al. |
| 6,291,036 B1 | 9/2001 | Wang |
| 6,352,749 B1 | 3/2002 | Aggas |
| 6,365,242 B1 | 4/2002 | Veerasamy |
| 6,372,312 B1 | 4/2002 | Aggas |
| 6,383,580 B1 | 5/2002 | Aggas |
| 6,387,460 B1 | 5/2002 | Shukuri |
| 6,399,169 B1 | 6/2002 | Wang |
| 6,416,375 B1 | 7/2002 | Cho |
| 6,420,002 B1 | 7/2002 | Aggas et al. |
| 6,436,492 B1 | 8/2002 | Landa et al. |
| 6,444,281 B1 | 9/2002 | Wang |
| 6,468,610 B1 | 10/2002 | Morimoto |
| 6,478,911 B1 | 11/2002 | Wang |
| 6,479,112 B1 | 11/2002 | Shukuri |
| 6,497,931 B1 | 12/2002 | Aggas |
| 6,503,583 B2 | 1/2003 | Nalepka et al. |
| 6,506,272 B1 | 1/2003 | Aggas |
| 6,521,988 B1 | 2/2003 | Hauser et al. |
| 6,537,121 B1 | 3/2003 | Baret |
| 6,538,312 B1 | 3/2003 | Peterson et al. |
| 6,541,083 B1 | 4/2003 | Landa et al. |
| 6,541,084 B2 | 4/2003 | Wang |
| 6,548,895 B1 | 4/2003 | Benavides et al. |
| 6,558,494 B1 | 5/2003 | Wang |
| 6,571,580 B1 | 6/2003 | Lodge |
| 6,627,814 B1 | 9/2003 | Stark |
| 6,635,321 B2 | 10/2003 | Wang et al. |
| 6,637,644 B2 | 10/2003 | Bachli |
| 6,639,313 B1 | 10/2003 | Martin et al. |
| 6,641,689 B1 | 11/2003 | Aggas |
| 6,653,724 B1 | 11/2003 | Kim et al. |
| 6,656,768 B2 | 12/2003 | Thomas |
| 6,668,500 B1 | 12/2003 | Lamberts |
| 6,692,600 B2 | 2/2004 | Veerasamy |
| 6,696,849 B2 | 2/2004 | Ban et al. |

| | | | |
|---|---|---|---|
| 6,701,749 B2 | 3/2004 | Wang et al. |
| 6,723,379 B2 | 4/2004 | Stark |
| 6,736,295 B2 | 5/2004 | Lin et al. |
| 6,759,590 B2 | 7/2004 | Stark |
| 6,763,638 B1 | 7/2004 | Berger, Jr. |
| 6,789,362 B1 | 9/2004 | Hessabi |
| 6,793,990 B1 | 9/2004 | Sakaguchi |
| 6,860,075 B2 | 3/2005 | Bachli |
| 6,897,125 B2 | 5/2005 | Morrow et al. |
| 6,924,974 B2 | 8/2005 | Stark |
| 6,928,776 B2 | 8/2005 | Hornung |
| 6,946,171 B1 | 9/2005 | Aggas |
| 6,962,834 B2 | 11/2005 | Stark |
| 6,966,208 B1 | 11/2005 | Collins |
| 6,974,518 B2 | 12/2005 | Hornung |
| 7,045,181 B2 | 5/2006 | Yoshizawa |
| 7,081,178 B2 | 7/2006 | Collins |
| 7,100,343 B2 | 9/2006 | France |
| 7,114,306 B2 | 10/2006 | Minaai |
| 7,141,130 B2 | 11/2006 | Minaai |
| 7,238,546 B2 | 7/2007 | Stark |
| 7,517,712 B2 | 4/2009 | Stark |
| 7,832,177 B2 | 11/2010 | Stark |
| 2001/0020738 A1 | 9/2001 | Iizima et al. |
| 2002/0041424 A1 | 4/2002 | Lynam |
| 2002/0043046 A1 | 4/2002 | Cooper et al. |
| 2002/0113296 A1 | 8/2002 | Cho et al. |
| 2003/0188881 A1 | 10/2003 | Stark |
| 2004/0020676 A1 | 2/2004 | Stark |
| 2004/0104460 A1 | 6/2004 | Stark |
| 2004/0161530 A1 | 8/2004 | Stark |
| 2004/0187437 A1 | 9/2004 | Stark |
| 2004/0188124 A1 | 9/2004 | Stark |
| 2005/0067179 A1 | 3/2005 | Stark |
| 2005/0138892 A1 | 6/2005 | Misonou |
| 2005/0217319 A1 | 10/2005 | Yoshizawa |
| 2005/0257877 A1 | 11/2005 | Stark |
| 2005/0275079 A1 | 12/2005 | Stark |
| 2006/0157274 A1 | 7/2006 | Stark |
| 2006/0187608 A1 | 8/2006 | Stark |
| 2006/0191215 A1 | 8/2006 | Stark |
| 2006/0207218 A1 | 9/2006 | Minaai et al. |
| 2009/0032924 A1 | 2/2009 | Stark |
| 2009/0074997 A1 | 3/2009 | Stark |
| 2010/0034996 A1 | 2/2010 | Mott |
| 2010/0068561 A1 | 3/2010 | Rohwer et al. |
| 2010/0119740 A1 | 5/2010 | Bettger |
| 2010/0175347 A1 | 7/2010 | Bettger et al. |
| 2010/0178439 A1 | 7/2010 | Bettger et al. |

FOREIGN PATENT DOCUMENTS

| | | | |
|---|---|---|---|
| EP | 1544180 A1 | 6/2005 |
| JP | 10-297944 A | 11/1998 |
| JP | 10-330134 A | 12/1998 |
| WO | 2006121954 A | 11/2006 |
| WO | 2010019484 A2 | 2/2010 |

OTHER PUBLICATIONS

PCT: International Search Report and Written Opinion of PCT/US2010/021286 (related application); Sep. 16, 2010; 7 pgs.
PCT: International Preliminary Report on Patentability of PCT/US2004/002272 (related application); Mar. 16, 2005; 4 pgs.
PCT: International Preliminary Examination Report of PCT/US2003/007553 (related application); Apr. 19, 2004; 7 pgs.
PCT: International Preliminary Report on Patentability of PCT/US2005/013237 (related application); Apr. 18, 2007; 9 pgs.
"Diffusion Bonding—Ceramics and ceramic/meal joints", TWI Knowledge Summary, 2000. http://www.twi.co.uk/content/ksjaf005.html.
Kazakov, N.F. (ed.); Diffusion Bonding of Materials; 1981; pp. 4-9, 248-257; Pergamon Press; U.S.A.
PCT: International Search Report and Written Opinion of PCT/US2009/053206 (related application); Feb. 17, 2010; 8 pgs.
Arata et al. Pressure and Field Assisted Bonding of Glass to Aluminum; Transactions of JWRI is published by Welding Research Institute of Osaka University; vol. 13; No. 1; 1984; pp. 35-40.
Carpenter Specialty Alloys: Controlled-Expansion Alloys (Catalog/Brochure); Dec. 1999; pp. 1-24 (esp. 5-8); Carpenter Technology Corporation (Publ.); Wyomissing, PA USA.
Cerjak, H. (ed.); Mathematical Modelling of Weld Phenomena 5; Diffusion Bonding of Glass to Metal in an Electrostatic Field; M. Morsy et al.; pp. 945-959; London IOM Communications, 2001.
Doron Teomim, Avner Badihi, Gil Zilber; "An innovative approach to wafer-level MEMS packaging"; Solid State Technology (Magazine); Jan. 2002; Penwell (Publ.); Nashua, NH USA.
Dunkerton; TWI Knowledge Summary Diffusion Bonding; Copyright 2001; TWI World Centre for Materials Joinging Technology Website; www.twi.co.uk; United Kingdom; 4 pages.
George S. Brady, et al., Materials Handbook, 12th Edition; 1986; pp. 28-29; McGraw-Hill Book Company; New York.
JPL Technology Reporting Office; "Hermetic Wafer Bonding by Use of Microwave Heating"; NASA Tech Brief, vol. 25, No. 5, from JPL New Technology Report NPO-20608 (NASA Contract No. NAS-7-918); May 1, 2001; Jet Propulsion Laboratory, California Institute of Technology (Publ.); Pasedena, CA, USA; including therein: NTR Inventors Report by Henry W Jackson, John D Mai, Martin B Barmatz, Nasser K Budraa, William T Pike; NASA Case No. 0205 20608; Mar. 1997(?); including therein: (same authors) "Low Pressure and Low Temperature Hermetic Wafer Bonding Using Microwave Heating"; Jet Propulsion Laboratory, California Institute of Technology; Pasadena, CA, USA.
Kazakov et al.; Equipment for Diffusion Welding of Rectangular Glass Plates to Kovar; Svarochnoe Proizvodstvo; Jun. 1977; p. 50; (In Russian, English translation provided).
Nicholas, M.G. & Lee, R. J.; Joining Dissimilar Materials, Metals and Materials, The Journal of the Institute of Metals, vol. 5, No. 6, Jun. 1989; UK.
NTR Inventors Report by Henry W Jackson, John D Mai, Martin B Barmatz, Nasser K Budraa, William T Pike; NASA Case No. 0205 20608; Mar. 1997(?); Including therein: (same authors) "Low Pressure and Low Temperature Hermetic Wafer Bonding Using Microwave Heating"; Jet Propulsion Laboratory, California Institute of Technology; Pasadena, CA, USA.
Ostyn, K. & Vinckier, A.; Joining of Different Materials Through Interfaces; Interfaces in Materials, Proceedings of the Colloquium; pp. 153-173; Brussels, Dec. 1988.
PCT: International Search Report of PCT/US03/07553 (related application); International Publication No. WO 03/083938 A1; Jun. 16, 2003; 2 pgs.
PCT: International Search Report of PCT/US04/02272 (related application); International Publication No. WO 2004/068189; Jan. 27, 2004; 1 pg.
R.C. Dykhuizen et al.; Gas Dynamic Principles of Cold Spray; Journal of Thermal Spray Technology; vol. 7(2); pp. 205-212; Jun. 1998.
Sadovsky et al.; Precision Welding of Glass to Kovar Without Melting; Svarochnoe Proizvodstvo; Feb. 1973; pp. 22; (In Russian, English translation provided).
PCT: Written Opinion of the International Searching Authority of PCT/US04/02272 (related application); International Publication No. WO 2004/068189; Mar. 16, 2005; 3 pgs.
PCT: International Search Report of PCT/US05/13237 (related application); International Publication No. WO 2005/118291 A3; Oct. 24, 2006; 1 pg.
PCT: Written Opinion of the International Searching Authority of PCT/US05/13237 (related application); International Publication No. WO 2005/118291; Oct. 24, 2006; 5 pgs.
PCT: International Search Report of PCT/US06/17595 (related application); International Publication No. WO 2006/121954; Aug. 20, 2008; 3 pgs.
PCT: Written Opinion of the International Searching Authority of PCT/US06/17595 (related application); International Publication No. WO 2006/121954; Aug. 20, 2008; 10 pgs.
PCT: International Search Report of PCT/US08/76278 (related application); Jan. 16, 2009; 4 pgs.
PCT: Written Opinion of the International Searching Authority of PCT/US08/76278 (related application); Jan. 16, 2009; 5 pgs.
PCT: International Preliminary Report on Patentability of PCT/US2008/076278 (related application); Mar. 25, 2010.

* cited by examiner

FILAMENT-STRUNG STAND-OFF ELEMENTS FOR MAINTAINING PANE SEPARATION IN VACUUM INSULATING GLAZING UNITS

CROSS-REFERENCE TO RELATED APPLICATIONS

This application claims the benefit of U.S. Provisional Application for Patent Ser. No. 61/145,093, filed Jan. 15, 2009, and entitled "FILAMENT-STRUNG STAND-OFF ELEMENTS FOR MAINTAINING PANE SEPARATION IN A VACUUM INSULTING GLAZING UNITS", the specification of which is incorporated herein in its entirety.

This Invention was made with government support under Contract No. DE-FC26-06NT42765 awarded by the Department of Energy. The Government has certain rights in this invention.

TECHNICAL FIELD

The following disclosure relates to insulating windows and glazing products. More particularly, it relates to vacuum insulating glazing units with multiple transparent panes having an evacuated space therebetween.

BACKGROUND

Vacuum insulating glazing units ("VIGU") are known comprising two spaced-apart transparent panes (typically formed of glass) having an evacuated atmosphere therebetween to reduce the thermal conductivity between the panes. Most VIGU assemblies further include a plurality of small objects that are positioned between the panes so as to touch the opposing inside surfaces of the panes. When the enclosed volume between the panes is evacuated of air, these objects maintain the separation between the panes against the forces applied by atmospheric pressure bearing on the external surfaces. These separation-maintaining objects are called a variety of names in the prior art, e.g., pillars and spacers, however, in this application they will be referred to primarily as "stand-off elements" to differentiate them from other items that are in common use in the insulating glass (IG) industry.

In prior art VIGU products, each stand-off element is first individually positioned on one of the two panes and then affixed in place. This positioning of the stand-off elements may be done manually, by robotic "pick and place" machines or other automatic devices, by liquid transport or by screen printing/stenciling. The affixing of the stand-off elements to the pane may be done individually or en masse using, for example, adhesives, tack welding or heating in a furnace. In some cases, the spacers are affixed to both panes of the VIGU. Regardless of the process used, the complexity of individually positioning and affixing stand-off elements is believed to be a significant component in the cost of manufacturing VIGU products. A reduction in manufacturing costs is needed to facilitate the widespread entry of VIGU products into the commercial and residential glazing market.

For a VIGU with a given pane size, vacuum level, pane material and stand-off element material, the total surface area of stand-off elements required to prevent cracking of the panes or crushing of the stand-off elements themselves may be calculated. However, the question of whether to provide this required surface area by using a relatively small number of relatively large (i.e., in projected area) stand-off elements, or alternatively, by using a relatively large number of relatively small stand-off elements, has posed a dilemma for manufacturers. On the one hand, a relatively small number of relatively large stand-off elements is easier (and thus less costly) to manufacture and affix on the pane, however, the larger size makes the stand-off elements more likely to be visible, making the VIGU less desirable from an aesthetic standpoint. On the other hand, a relatively large number of relatively small stand-off elements is more difficult (and thus more costly) to manufacture and affix on the pane, however, the small stand-off elements are less likely to be visible, making the VIGU more aesthetically desirable. A need therefore exists, for VIGU stand-off elements that are easy to manufacture and affix on the pane, even when the stand-off elements are very small in size and very large in number.

It is further known that thermal cycling that is encountered during the life of the VIGU will lead to differential expansion and contraction of the two panes on either side of the stand-offs. In prior art VIGU products having stand-off elements affixed to one pane, the movement of the stand-off elements on the attached pane relative to the unattached pane may result in scratching the inner surface of the unattached pane or wearing of the tips of the stand-offs. In addition, the friction at the tip of the stand-off elements may restrict relative movement between the panes, allowing stresses to build that may crack the panes. A need therefore exists, for VIGU stand-off elements that facilitate differential movement between the panes with reduced wear and friction.

SUMMARY

In one aspect thereof, a stand-off assembly for a Vacuum Insulating Glazing Unit (VIGU) comprises a filament formed of a vacuum-resistant material that does not materially decompose or materially outgas over a prolonged period at a reduced pressure, and a plurality of stand-off elements affixed to the filament at predetermined positions. Each stand-off element is formed of a vacuum-resistant material that does not decompose or outgas over the prolonged period at the reduced pressure.

In another aspect thereof, a stand-off array unit for a VIGU comprises first and second anchors, a plurality of filaments, and a plurality of stand-off elements. The filaments and the stand-off elements are formed of vacuum-resistant material(s) that do not decompose or outgas over a prolonged period at a reduced pressure. The anchors are spaced apart from one another a distance that substantially corresponds to the distance between the opposite edges of one pane of the VIGU. Each filament is attached at one end to the first anchor and at the other end to the second anchor. The filaments are collectively disposed substantially parallel to one another. The stand-off elements are disposed on each filament at predetermined positions along the filament and have a height equal to the predetermined height of the gap between the panes of the VIGU. The stand-off elements may be formed separately from the filament and then affixed onto the filament, or, in another embodiment, they may be integrally formed from the material of the filament itself.

In yet another aspect thereof, a VIGU comprises first and second panes of transparent material, first and second anchors, a plurality of filaments, a plurality of stand-off elements, and seals. The first and second panes of transparent material have edges and inner and outer faces, are disposed with their inner faces substantially opposing one another, and are separated by a gap having a predetermined height. The first and second anchors are disposed at opposite edges of one pane of the VIGU. Each filament is attached at one end to the first anchor and at the other end to the second anchor, and the filaments are collectively disposed between the panes substantially parallel to one another. The stand-off elements are affixed to each filament at predetermined positions along the filament, and have a height equal to the predetermined minimum height of the gap. The seals are disposed about the edges of the panes, enclosing the stand-off elements within a volume between the panes from which the atmosphere may be evacuated to form a partial vacuum.

BRIEF DESCRIPTION OF THE DRAWINGS

For a more complete understanding, reference is now made to the following description taken in conjunction with the accompanying Drawings in which:

FIGS. 2A-2B illustrate a VIGU in accordance with one aspect of the current disclosure, wherein FIG. 2A is a cross-sectional side view of a VIGU having filament-strung stand-offs, and FIG. 2B is a perspective view of a complete VIGU of FIG. 2A;

FIGS. 2C-2D illustrate alternative embodiments of VIGU in accordance with other aspect of the current disclosure, wherein FIG. 2C is a cross-sectional side view of a VIGU having a filament anchored between the seal members and wherein FIG. 2D is a cross-sectional side view of a VIGU having a filament anchored to the interior of the seal members FIGS. 3A-3C illustrate the attachment of deformable cylindrical stand-off elements to a filament in accordance with another aspect, wherein FIG. 3A shows the stand-off elements before fixation, FIG. 3B shows the stand-off elements after fixation on the filament and FIG. 3C shows an alternative stand-off element that is deformed to provide flat surfaces;

FIGS. 4A and 4B illustrate the attachment of cylindrical stand-offs element to a filament using laser welding in accordance with another aspect, wherein FIG. 4A shows the stand-off elements before fixation and FIG. 4B shows the stand-off elements after fixation on the filament;

FIGS. 5A-5D illustrate the attachment of split cylindrical stand-off elements to a filament in accordance with another aspect, wherein FIG. 5A shows the stand-off elements before placement on the filament, FIG. 5B shows the stand-off elements after placement but before fixation, FIG. 5C shows the stand-off elements after fixation on the filament and FIG. 5D shows an alternative stand-off element having a rectangular cross-section that provide flat surfaces.

FIGS. 7A and 7B illustrate stand-off elements formed in-place on the filament in accordance with another aspect, wherein FIG. 7A shows the un-solidified material being deposited on the filament and FIG. 7B shows the stand-off elements after solidification on the filament;

FIGS. 8A-8B illustrate stand-off assemblies having integral stand-off elements, wherein FIG. 8A shows a stand-off assembly having looped stand-offs, and FIG. 8B shows a stand-off assembly having variable dimension filaments;

FIG. 8C shows the stand-off assembly of FIG. 8B taken along line 8C-8C of FIG. 8B, FIG. 8D is an alternative stand-off assembly having raised portions with octagonal cross-sections and FIG. 8E is another alternative stand-off assembly having raised portions with rectangular cross-sections;

FIGS. 9A-9C illustrate the orientation of stand-off elements in a stand-off array unit on a pane of the VIGU, wherein FIG. 9A shows the stand-off elements before orientation, FIG. 9B shows a dithering signal being applied to the pane and FIG. 9C shows the stand-off elements after it moves into the desired orientation;

DETAILED DESCRIPTION

Figure 1A:
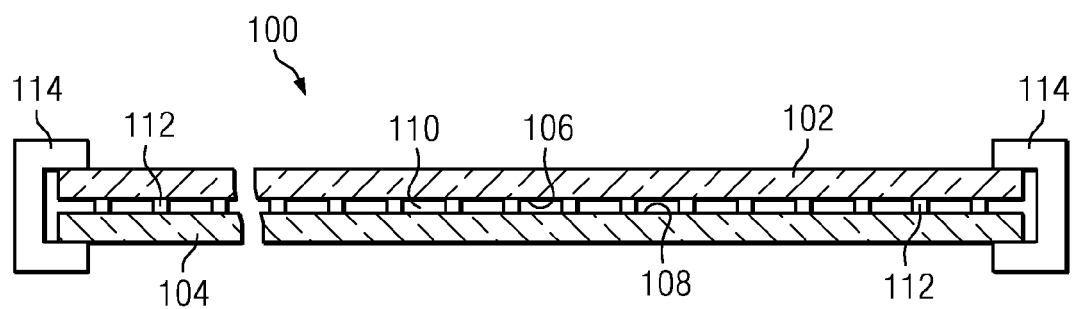
FIG. 1A is a cross-sectional side view of a VIGU in accordance with the PRIOR ART.

Referring now to the drawings, wherein like reference numbers are used herein to designate like elements throughout, the various views and embodiments of filament-strung stand-off elements for maintaining pane separation in a vacuum insulating glazing unit are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1B:
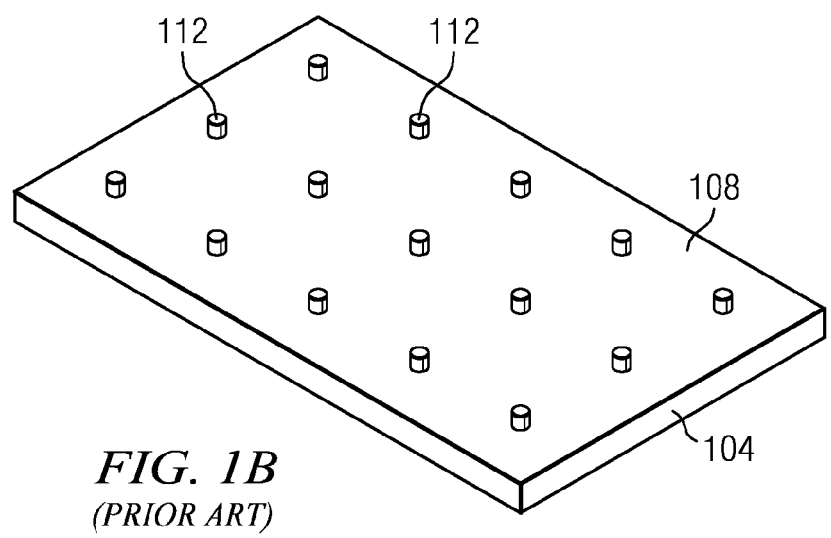
FIG. 1B shows one pane of the PRIOR ART VIGU of FIG. 1A showing the discrete stand-off elements individually positioned thereon.

Referring now to FIGS. 1A and 1B, there is illustrated a VIGU in accordance with the PRIOR ART. As best seen in FIG. 1A, the VIGU 100 includes two panes 102 and 104 formed of a transparent material, typically glass. The panes 102 and 104 are disposed with their inner faces 106 and 108, respectively, substantially opposing one another and separated by a gap 110 having a predetermined width. A plurality of individual stand-off elements 112 are disposed between panes 102 and 104 such that they are in with contact the inner faces 106 and 108. Edge seals 114 are provided around the periphery of the panes 102 and 104 enclosing the stand-off elements 112 within a volume between the panes from which the atmosphere may be evacuated to form a partial vacuum. The stand-off elements 112 serve to maintain the separation of the panes 102 and 104 against the forces produced by atmospheric pressure bearing on the outside surface of the panes.

Referring now to FIG. 1B, there is illustrated the lower pane 104 from the VIGU 100 shown in FIG. 1A. The individually-placed stand-off elements 112 can be seen on the inner face 108 of pane 104. As seen in FIG. 1B, each stand-off element 112 is disposed on the inner face 108 of the pane 104 and is not connected to any of the other stand-offs. In some embodiments (not shown), stand-off elements may be affixed to one or both panes, but not to other stand-offs.

Figure 2A:
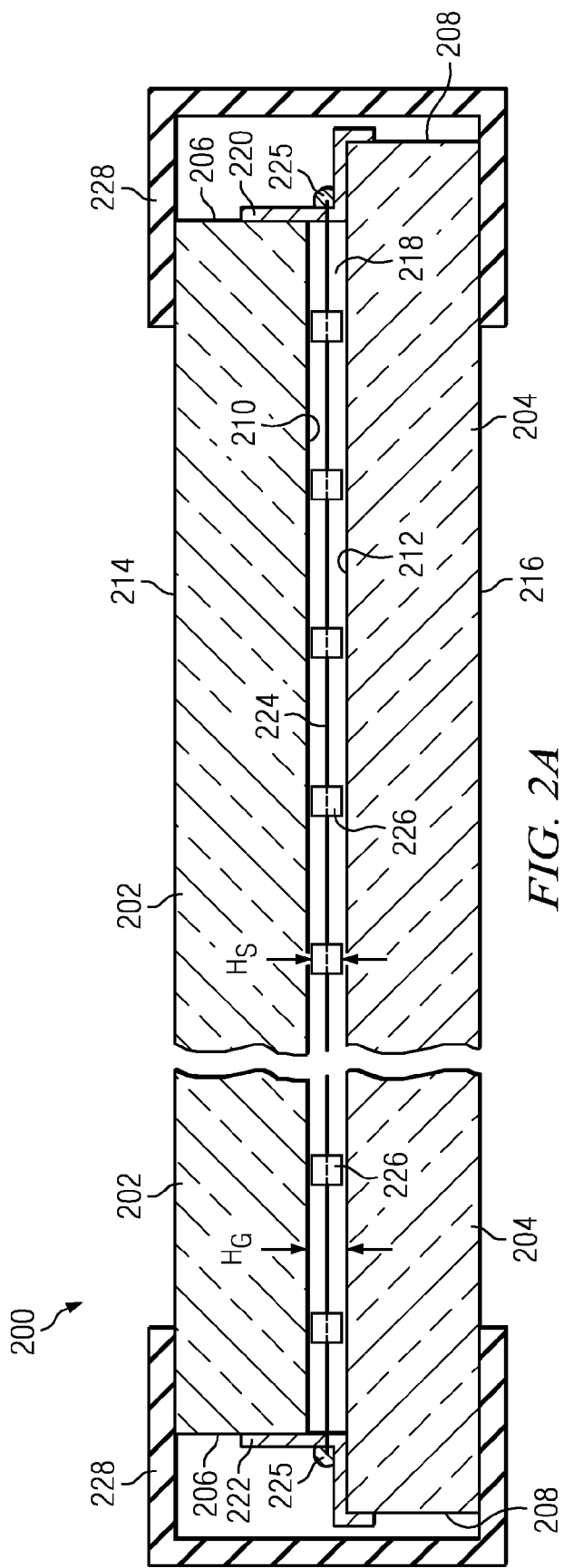
Figure 2B:
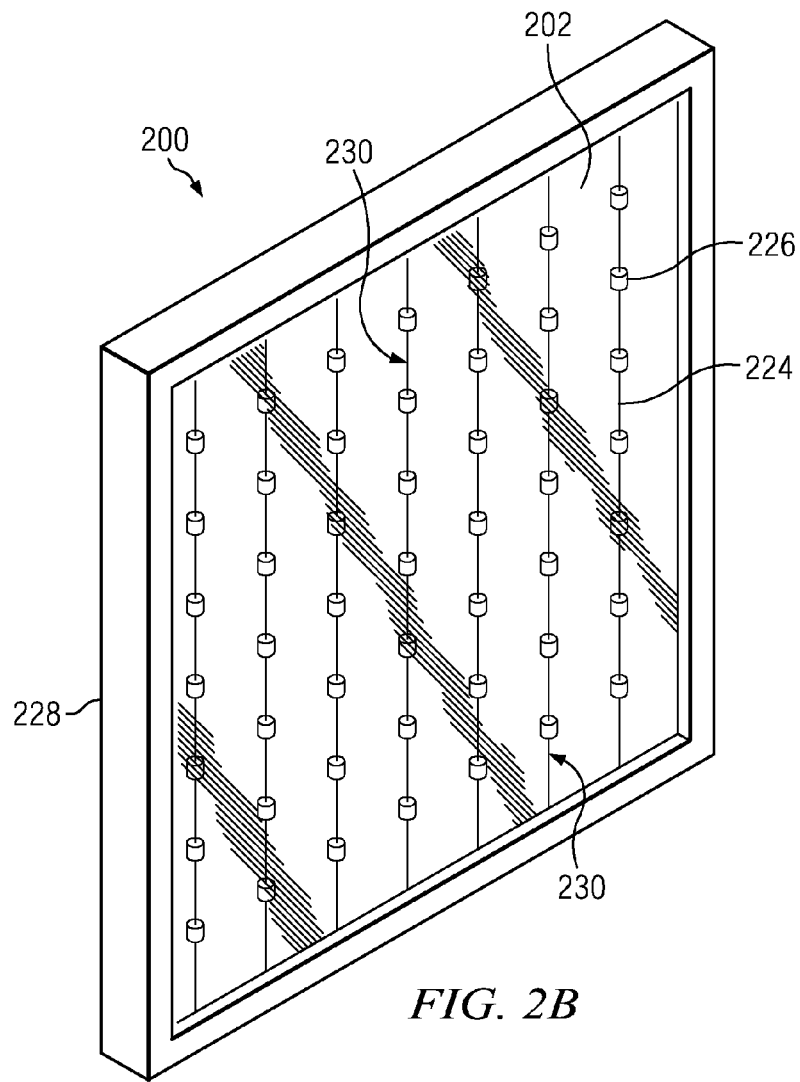

Referring now to FIGS. 2A and 2B, there is illustrated a VIGU in accordance with one aspect of the current disclosure. Turning first to FIG. 2A, the VIGU 200 comprises first and second panes 202 and 204 of transparent material, each pane having edges 206 and 208, inner faces 210 and 212 and outer faces 214 and 216, respectively. In the illustrated embodiment, the panes 202 and 204 are made of glass, for example soda-lime glass, but in other embodiments they may be formed of other types of glass, plastic or other transparent materials. In some embodiments, the panes 202 and 204 may be identical; however, this is not required. The panes may have different dimensions, e.g., length, width and/or thickness, be made of different materials, or have different coatings or treatments. For example, in the illustrated embodiment, pane 202 has different edge-to-edge width than pane 204. The panes 202 and 204 are disposed with inner faces 210 and 212 substantially opposing one another and separated by a gap 218 having a predetermined height $H_G$.

Referring still to FIG. 2A, anchors 220 and 222 are disposed at opposite edges of at least one pane of the VIGU 200. The anchors are preferably formed of a vacuum-resistant material that does not materially decompose or materially outgas over a prolonged period at a reduced pressure. Decomposition or outgassing is considered material if it adversely affects the structural strength, surface tribology, visibility, appearance, or vacuum level of the VIGU to the extent that such characteristic falls below the unit's minimum requirements. In the illustrated embodiment, anchors 220 and 222 are formed from stainless steel, but in other embodiments, they may be formed of various metals, metal alloys or non-metal materials. A plurality of wires or filaments 224 are collectively disposed within the gap 218 between the panes 202 and 204 and substantially parallel to one another. Each filament is attached at one end to anchor 220 and at the other end to anchor 222. In the illustrated embodiment, the filaments 224 are attached to the anchors 220, 222 with welds 225. However, in other embodiments, the filaments may be attached in other manners as further described herein. A plurality of stand-off elements 226 are formed on or affixed to each filament 224 at predetermined positions along the filament, thus creating a stand-off assembly. Each stand-off element 226 has a height $H_S$ that is substantially equal to the nominal $H_G$ (plus an allowance for dimensional variation of the glass panes, e.g., "roller wave distortion") such that the inner faces 210 and 212 of the panes remain separated by the required amount. Seals 228 are disposed about the edges of the panes 202 and 204, enclosing the stand-off elements 226 within a volume between the panes from which the atmosphere may be evacuated to form a partial vacuum.

In the illustrated embodiment, the anchors 220 and 222, filaments 224 and stand-off elements 226 are all enclosed within the seals 228. In other embodiments, portions of the anchors, filaments and/or stand-off elements may lie outside the sealed volume. In still other embodiments, the anchors 220 and 222 may form an integral part of the seal itself. Preferably, the seals 228 are bonded hermetically to the panes 202 and 204 such that a high vacuum may be maintained within the gap 218 for an extended period of time. In preferred embodiments, the seals are sufficient to maintain a vacuum within the range of $10^{-6}$ torr to $10^{-3}$ torr for a minimum of twenty-five years.

Referring now to FIG. 2B, there is illustrated a complete VIGU 200 showing the stand-off assemblies 230, each comprising a plurality of stand-off elements 226 affixed to a filament 224. The stand-off assemblies 230 are disposed in a parallel arrangement to one another in the gap 218 (FIG. 2A) between the panes 202 and 204. In a preferred embodiment, the stand-off assemblies 230 will be disposed so as to be vertically oriented when the VIGU 200 is installed in a building. It will be appreciated that the size of the stand-off assemblies 230 are greatly exaggerated in FIG. 2B for purposes of illustration. In embodiments using the preferred dimensions of the filaments 224 and stand-off elements 226, the stand-off assemblies 230 will be virtually invisible at normal viewing distances.

In accordance with another aspect, the wires or filaments 224 used to position the many individual stand-off elements 226 between the inner and outer VIGU glass panes 202 and 204 have a diameter within the range from 0.0003 inches to 0.002 inches. In a preferred embodiment, the filaments 224 have a diameter of 0.001 inches or less. The filaments 224 may be wires formed from a variety of metals or metal alloys, including stainless steel, controlled expansion metal alloy, inconel, brass, bronze, copper and titanium; or they may be non-metal filaments formed of non-metal materials including but not limited to glass fibers, carbon fibers, ceramic-based materials and nano-technology structures such as fibers containing carbon nanotubes. The term controlled-expansion metal alloys refers to high-nickel alloys, nickel-iron alloys and other metal alloys having thermal expansion characteristics similar to any of the Permalloy brand(s) of alloy(s) available from ATI of Pittsburgh, Pa., or to any of Invar 36 brand, Low Expansion 39 brand, Low Expansion 42 brand, Thermostat 42 Alloy brand, Low Expansion 45 brand, Low Expansion 49 brand, Glass Sealing 52 brand, Alloy 42 brand, Alloy 49 brand or Kovar brand alloys available from Carpenter Technology Corporation (CARTECH) of Reading, Pa.

In still other embodiments, the filaments 224 may be threads formed of natural or synthetic industrial fibers such as cotton, rayon, nylon, silk, aramid fibers (e.g., Kevlar®), etc. Such natural or synthetic industrial fibers may or may not be completely vacuum-resistant, but may nonetheless be suitable for use in some embodiments. The filaments 224 may have a single-stranded (i.e., monofilament) structure, multi-stranded structure, or spun structure. In a preferred embodiment, the filaments 224 are stainless steel wires. Regardless of what material is used for the supporting filaments 224, the material must not outgas to the extent of materially degrading the vacuum of the device or its other characteristics. Further, in some embodiments the supporting filaments 224 exhibit low visible light reflectivity, thereby reducing their visibility. This low light reflectivity of the supporting filament 224 may be an inherent characteristic of the underlying filament material, or it may result from a surface treatment or surface coating applied to the filament.

As previously described, a plurality of stand-off assemblies 230, each including a supporting filament 224 and multiple spaced-apart individual stand-off elements 226, are attached at their respective free ends to separate wire-positioning forms or anchors 220, 222, thereby creating a discrete stand-off array unit (FIG. 10) for subsequent positioning between the transparent panes of the VIGU. The anchors 220, 222 may be constructed of metal or other vacuum-resistant materials with long-term stability and zero or near-zero outgassing properties when used inside the VIGU. Depending on the materials selected, the support filaments 224 may be fastened to the anchors 220, 222 by welding, by soldering, by securing the filaments through holes in the anchors, or by deforming portions of the anchors to grip the ends of the filaments. In a preferred embodiment, the filaments are attached to the anchors using welding.

The filament/wire-positioning anchors 220, 222 may have any form that supports the ends of the filaments 224 and facilitates holding the stand-off elements 226 in position within the gap 218 between the transparent panes 202, 204 of the VIGU. The anchors themselves may or may not be disposed completely outside the gap 218, i.e., some portion of the anchors 220, 222 may extend between the panes 202, 204.

However, the anchors 220, 222 will not typically be readily visible in the completed VIGU. In preferred embodiments, the anchors 220, 222 are formed in a shape that can be readily secured to the edges of the panes 202, 204 and/or to the seals 228 to keep the stand-off array unit in place during further assembly of the VIGU, during shipping, and during the life of the VIGU in its final (i.e., end-use) installation.

Figure 2C:
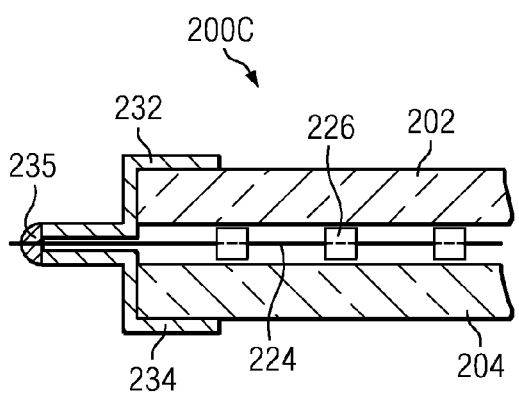
Figure 2D:
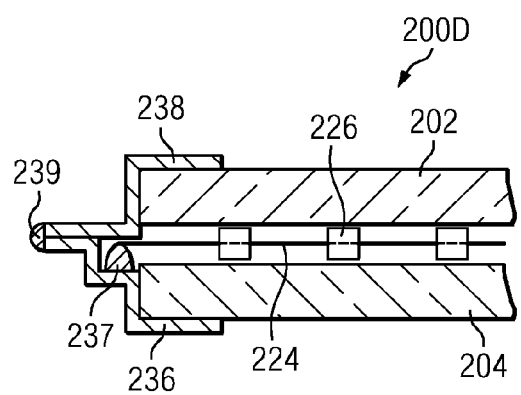

Referring now to FIGS. 2C-2D, there is illustrated alternative embodiments of VIGU in accordance with other aspect of the current disclosure. In these embodiments, the separate seals 228 and filament anchors 220 of FIG. 2A are replaced by a pair of seal members. FIG. 2C shows a VIGU 200C having a filament 224 anchored between the separately-formed seal members 232 and 234. An end seal 235, e.g., a weld, hermetically bonds the two seal members 232, 234 and the filament 224 at the same time. FIG. 2D shows a side view of a VIGU 200D having a filament 224 anchored to the interior of one seal member 236 with a joint 237. The joint 237 need not be hermetic, since it is inside the evacuated area formed by the seals, thus adhesives may be used in case the material of the filament 224 is incompatible with welding. The second seal member 238 does not connect to the filament 224. Instead, the seal members 236, 238 are hermetically sealed with a second seal 239, e.g., a weld seal.

Generally speaking, the filament-strung stand-offs of the current invention mitigate the visual detection of the gap-maintaining components by using individual stand-off elements which are relatively small in dimension, projected surface area and height. In some embodiments, the range of stand-off height, which equates to the nominal gap between the VIGU panes plus some additional small amount (e.g., to compensate for dimensional variation), may be within the range from 0.003 inches to 0.012 inches; in preferred embodiments the height may be about 0.006 inches to about 0.009 inches. The projected shape (also called the "footprint") of the stand-off elements is the shape that is apparent when viewing the stand-off elements in a direction normal to the largest surface area of the window pane. This projected shape/footprint may be round (i.e., circular), but as further described below, it is not limited to round. Regardless of the actual shape of the stand-off footprint, in preferred embodiments each stand-off footprint will fit within a projected circle having a diameter within the range from 0.004 inches to 0.018 inches. In more preferred embodiments, the footprint of each stand-off fits inside a projected circle having a diameter of 0.010 inches or less. The visual detection of the separation components may be further reduced by preparing the surfaces of the stand-off elements and/or supporting filaments to be non-reflective, so that the reflection of light is substantially reduced from levels ordinarily associated with various manufactured materials.

The stand-off elements 226 may be of any size, shape and material, but preferably they will be of a size selected to minimize their visibility. The shape will be selected to facilitate ease of manufacture and/or to reduce friction between the stand-off element and the adjacent panes of the VIGU. In some embodiments, the individual stand-off elements 226 are cylindrical tubes with an outside diameter within the range of 0.003 to 0.012 inches and an inside (i.e., hole) diameter within the range of 0.0005 to 0.0025 inches. The length of these stand-offs may be within the range of 0.004 to 0.018 inches. In a preferred embodiment, the cylindrical stand-offs 226 have an outside diameter of about 0.006 inches and an inside (i.e., hole) diameter of about 0.001 inches and a length of about 0.008 inches.

As further described below, the stand-offs 226 may be threaded onto the supporting filaments 224 and may utilize various means of fastening them to the supporting filaments. The stand-offs 226 may be constructed from various materials, including, but not limited to, metals or alloy metals, such as stainless steel, inconel, copper or bronze, and non-metal materials such as glass or ceramics. In a preferred embodiment, the individual stand-off elements will be constructed of stainless steel.

The filament-strung stand-offs may be manufactured in a way such that they are very cost-effective. In some embodiments, the stand-off elements 226 may be affixed to or formed on the filaments 224 prior to assembly of the VIGU and stored in bulk, e.g., on wire reels for later use. In other embodiments, the stand-off elements 226 may be affixed to or formed on the filaments 224 during fabrication of the stand-off array units. In yet other embodiments, the stand-off elements 226 may be affixed to or formed on the filaments 224 after the filaments have been connected to the anchors 220, 222.

In some embodiments, the substantially parallel surfaces of the stand-off elements that come into contact with the inner surfaces of the transparent panes of the VIGU may actually have slightly convex or "crowned" surfaces. Such stand-offs with crowned surfaces may more closely match the profile of the inner pane surfaces when the panes are subjected to atmospheric pressure loading resulting from the vacuum between the adjacent, parallel panes of the VIGU. In other embodiments, the individual stand-off elements may be adapted to deflect slightly under the loading produced by atmospheric pressure on the adjacent panes. The prescribed deflection of the individual stand-off elements may be used to compensate for deviations from perfect flatness in the inner and outer pane surfaces. Further, both the prescribed deflections and the slightly crowned shape may be used to ensure that the contact area between the stand-offs and inner and outer panes is maximized, to help ensure that the localized applied stresses on the stand-off elements and the panes are uniform and at the lowest possible levels. In addition, the advantageous shapes are intended to reduce forces between the stand-off and the panes that may occur when the inner and outer panes expand or contract differentially, e.g., during heating and cooling.

Differential ambient temperatures between the inner and outer panes of the VIGU typically causes corresponding differential expansion and contraction of the panes themselves. Therefore, there may be some relative movement or "slippage" between the inner pane surface and the surface of the individual stand-off elements at their respective points of contact. High friction levels at these points of contact may produce noticeable wear patterns on the pane. In preferred embodiments, the stand-off elements include provisions for friction reduction and mitigation of wear at the interface between the stand-off and pane. The wear-reducing provision may be added to the glass surface, the stand-off surface or the stand-off itself. In some embodiments, friction reduction is provided by coating the stand-off elements with an anti-friction material, e.g., graphite, or with a low shear-strength interfacial material to provide lubrication, for example, molybdenum disulfide ($MoS_2$). In other embodiments, friction reduction is provided by configuring the stand-off elements as cylinders or other shapes having a circular or ovoid cross-section and orienting them on the filament such that the filament runs along the cylinder axis, thereby allowing the stand-offs to "roll" between the panes while twisting the filaments.

As previously described, a plurality of individual stand-off elements affixed to or formed on a filament is termed a stand-off assembly. A plurality of stand-off assemblies attached between a pair of anchors is termed a stand-off array unit. Such stand-off array units may be manufactured in advanced and stored, or they may be manufactured during assembly of the VIGU. It is desired that the structure and material of the individual stand-off elements should facilitate rapid placement on filaments to form a stand-off assembly.

Fastening individual stand-off elements to the supporting filaments may be accomplished by several means including, but not limited to: deforming the individual stand-off element to grip the filament; welding or melting part or all of the individual stand-off element to the filament (or vice-versa); or deforming the filament in such a fashion that the individual stand-off element is held in place. A preferred embodiment is deforming the individual stand-off elements to hold each one in place on the supporting filament. Described below are additional details of the forms and methods of fixation for the stand-offs; however, it will be appreciated that other shapes and methods exist and the following is not intended to be limiting.

Figure 3A:
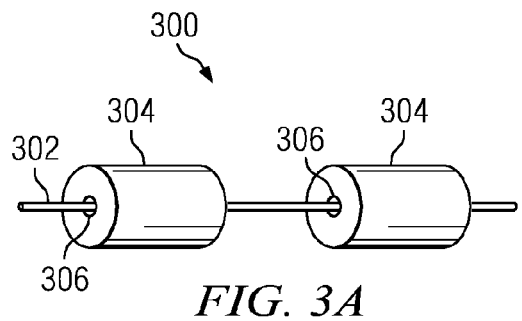
Figure 3B:
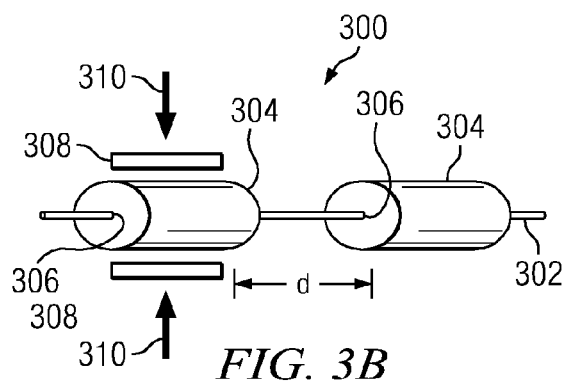
Figure 3C:
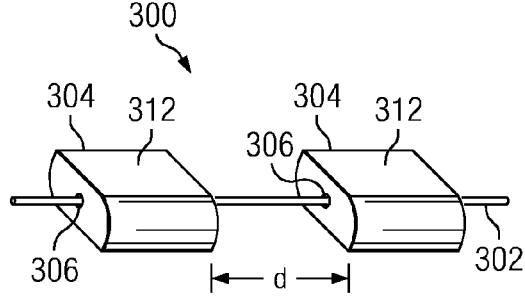

Referring now to FIGS. 3A and 3B, there is illustrated a stand-off assembly in accordance with one embodiment. Stand-off assembly 300 comprises a filament 302 and a plurality of stand-off elements 304 affixed to the filament at predetermined positions. As best seen in FIG. 3A, the stand-off elements 304 may have a cylindrical configuration having a hole 306 defined along the cylindrical axis. The filament 302 is first threaded through the holes 306 in the stand-off elements 304. The stand-off elements 304 are then placed in predetermined positions along the filament 302. The predetermined positions of the stand-off elements 304 along the filament 302 may be evenly-spaced or spaced in another pattern, depending on the design of the VIGU. As seen in FIG. 3B, in the illustrated embodiment, the stand-off elements 304 are placed in a predetermined position by spacing at a fixed distance (denoted "d") from one another. The stand-off elements 304 are then affixed in place along the filament 302 by forcibly deforming the stand-off element such that the hole 306 squeezes against the filament. The deforming force may be applied by any known means, including striking with hammers, pressing, swaging or rolling between sizing wheels. In the illustrated embodiment, a press 308 is used to deform the stand-off element 304 with force being shown by arrows 310. It will be appreciated that the stand-off elements may be any shape and size, i.e., they are not limited to the cylindrical shapes shown in FIGS. 3A and 3B. FIG. 3C shows an alternative embodiment in which the stand-off elements 304 are further deformed to create flat surfaces 312.

Figure 4A:
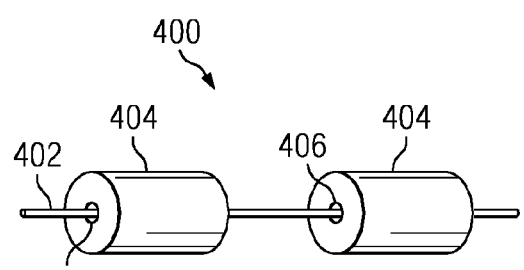
Figure 4B:
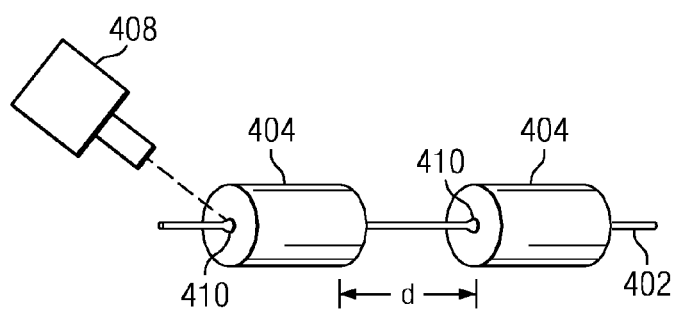

Referring now to FIGS. 4A and 4B, there is illustrated a stand-off assembly in accordance with another embodiment. Stand-off assembly 400 is similar in many respects to assembly 300, including filament 402 and a plurality of stand-off elements 404 affixed to the filament at predetermined positions. The stand-off elements 404 may have a cylindrical configuration and holes 406 through the axis as previously described. In this case, however, after the filament 402 is threaded through holes 406, and the stand-off elements are placed in the predetermined positions, they are not affixed using deformation. Instead, a laser 408 affixes the stand-off elements 404 to the filament 402 by melting a small portion of the stand-off element and/or filament to form a spot-weld 410. Since the spot-welding process does not involve substantial deformation of the stand-off element 404, it is suitable for use with stand-off elements made from brittle materials such as glass or ceramic.

Figure 5A:
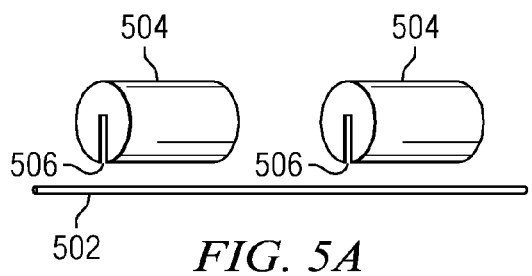
Figure 5B:
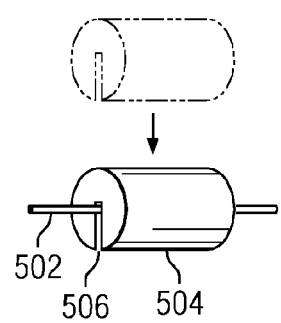
Figure 5C:
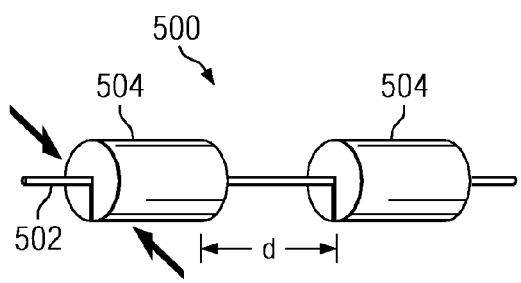

Referring now to FIGS. 5A-5C, there is illustrated a stand-off assembly in accordance with another embodiment. Stand-off assembly 500 (FIG. 5C) is similar in many respects to assemblies 300 and 400, including filament 502 and a plurality of stand-off elements 504 affixed to the filament at predetermined positions. As seen in FIG. 5A, the stand-off element 504 may have a cylindrical configuration; however, rather than having a hole along the cylinder axis, the stand-off element has a longitudinal slot 506 formed from the sidewall to the cylinder axis. Slot 506 has a width equal to or greater than the diameter of the filament 502 such that the stand-off element 504 may be placed on to the filament, as shown in FIG. 5B. As seen in FIG. 5C, after the stand-off element 504 is positioned on filament 502 (i.e., the filament positioned along the cylinder axis), the stand-off element may be forcibly deformed as denoted by arrows 508, such that the slot 506 closes against the filament, thus affixing the stand-off element in place. In some circumstances, the slotted stand-off element configuration may be preferred to the threaded configurations shown in FIGS. 3A-B and FIGS. 4A-B because it does not require the stand-off element to be moved along the entire length of the filament.

Figure 5D:
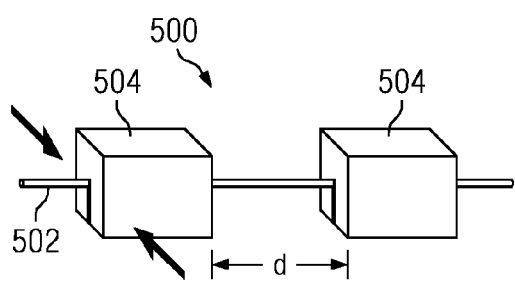

The stand-off assemblies shown in many of the previously described embodiments include stand-off elements having a cylindrical configuration. While a cylindrical configuration may have advantages, such as the ability to roll back and forth between the panes during thermal cycling, it will be appreciated that stand-off elements having other shapes may be used. I.e., they are not limited to the cylindrical shapes shown in FIGS. 3A-B and 4A-B. In some circumstances, non-cylindrical shapes may be preferred. FIG. 5D shows an alternative embodiment in which the slotted stand-off elements 504 are configured in a rectangular shape.

Figure 6A:
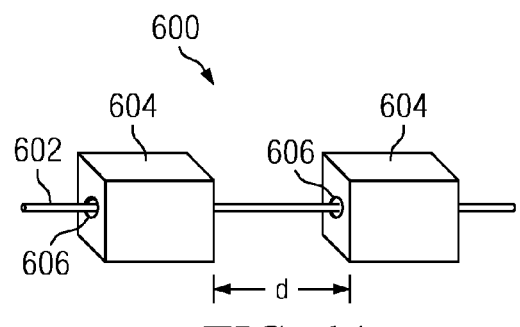
FIG. 6A shows a stand-off assembly having rectangular stand-off elements in accordance with another embodiment.

Referring now to FIG. 6A, there is illustrated a stand-off assembly 600, including filament 602 having a plurality of rectangular-shaped stand-off elements 604 affixed at predetermined locations. Although the illustrated embodiment shows the rectangular stand-off elements 604 having holes 606 formed through their long axes, it will be appreciated that the rectangular stand-off elements 604 could be formed with slots. It will be further understood that the stand-off elements 604 can be attached to the filament 602 using any of the techniques described above.

Figure 6B:
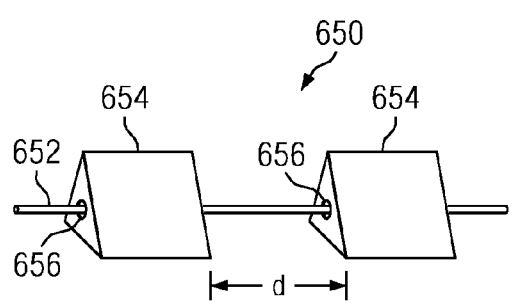
FIG. 6B shows a stand-off assembly having triangular, prism-shaped stand-off elements in accordance with another embodiment.

Referring now to FIG. 6B, there is illustrated a stand-off assembly 650, including filament 652 having a plurality of triangular, prism-shaped stand-off elements 654 affixed at predetermined locations. Although the illustrated embodiment shows the stand-off elements 654 having holes 656 formed through their long axes, it will be appreciated that the stand-off elements 654 could be formed with slots. It will be further understood that the stand-off elements 654 can be attached to the filament 652 using any of the techniques described above.

Figure 7A:
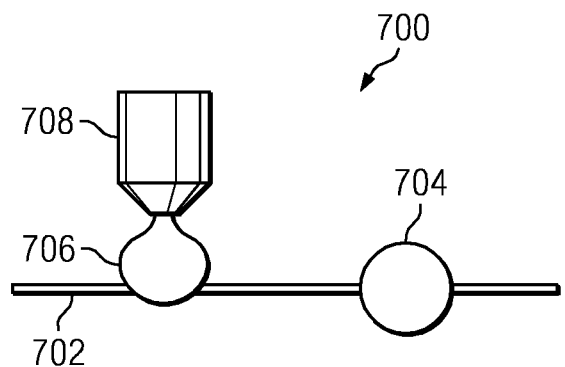
Figure 7B:
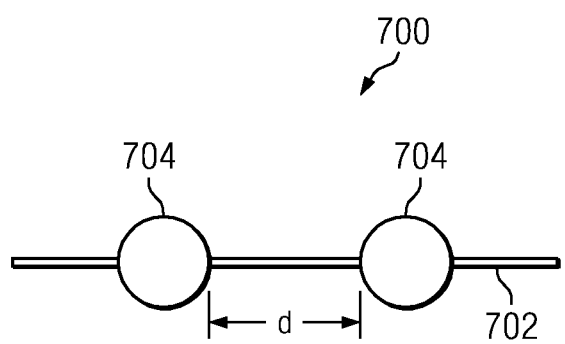

Referring now to FIGS. 7A and 7B, there is illustrated a stand-off assembly having formed-in-place stand-offs. The stand-off assembly 700 (FIG. 7B) includes a filament 702 and a plurality of formed-in-place stand-off elements 704. As shown in FIG. 7A, the formed-in-place stand-off elements 704 are created by depositing a quantity of nonsolid-material 706 (e.g., liquid or plastic state) onto the filament 702. For example, FIG. 7A shows nozzle 708 depositing a quantity of molten glass 706 onto filament 702. As the material 706 solidifies, it may be formed into its finished shape by a variety of methods, including surface tension, spinning, or molding.

A further, novel stand-off assembly configuration is generally described as integral filament-formed stand-offs, wherein the stand-offs are formed from the body of the wire or filament itself In one aspect thereof, each of the filaments is configured, e.g., by bending or other shaping operations, to include a series of accurately positioned loops, which at each individual loop location results in the filament permanently overlapping itself. These overlapping configurations, when subjected to the stresses associated with the evacuation of the space between the panes, will deform in a prescribed manner and, after that deformation, will establish a discrete stand-off element, the height of which is described as double the thickness of the filament, minus the amount of any deformation. This stand-off element, formed by the looped and overlapping filament, forms a prescribed spacing distance between the inner surfaces of the transparent panes, providing for the prescribed evacuated space in the VIGU.

In another aspect of integral filament-formed stand-offs, the wire or filament is shaped to have a variable thickness, thereby creating a series of generally thickened sections or "beads" that are formed from the filament itself These beads or thickened portions have prescribed size and shape, and occur at prescribed locations along the lineal length of the filament. The thickened portion is itself the stand-off element, and as such is formed with opposing surfaces that define the height of the stand-off This stand-off height, in turn, establishes the prescribed distance (gap) that is maintained between the inner surfaces of the glass panes of the VIGU. In some variable-thickness embodiments the thickened sections may have a height within the range from 0.003 inches to 0.012 inches. In preferred embodiments, the integral stand-offs may have a height of about 0.006 inches to about 0.009 inches.

Variable-thickness type integral filament-formed stand-offs may be formed from filaments having round cross-sections or non-round cross-sections, e.g., squares or rectangles. For example, in the case of a filament having a round cross section, the integral stand-off elements may comprise longitudinally localized areas of the filament having a diameter that is substantially greater than the nominal diameter of the filament. In preferred embodiments, the longitudinally localized areas of the filament may have a diameter that is at least 10 times greater than the nominal diameter of the filament, and in more preferred embodiments, the longitudinally localized areas of the filament may have a diameter that is at least 20 times greater than the nominal diameter of the filament. The filaments may be formed from a variety of metals and metal alloys, including but not limited to stainless steel, controlled-expansion metal alloys, inconel, brass, bronze, copper and titanium. In a preferred embodiment, the variable-thickness filament is stainless steel. The filaments with integral filament-formed stand-offs may be fastened to positioning anchors as described above, and the anchors may be fastened to or held in place against the seal element around the periphery of the VIGU as previously described.

Figure 8A:
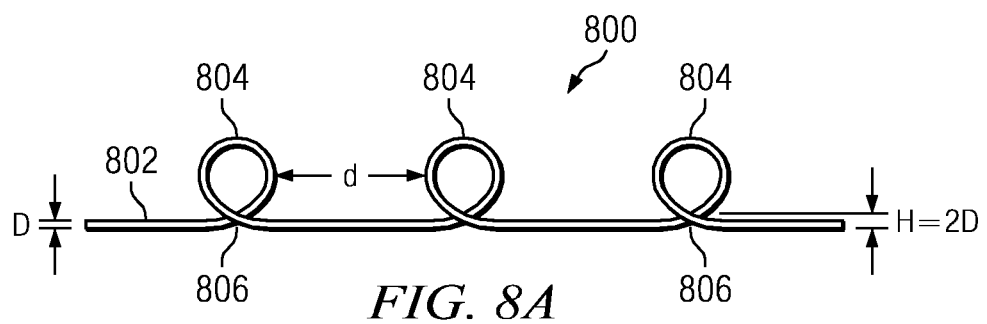
Figure 8B:
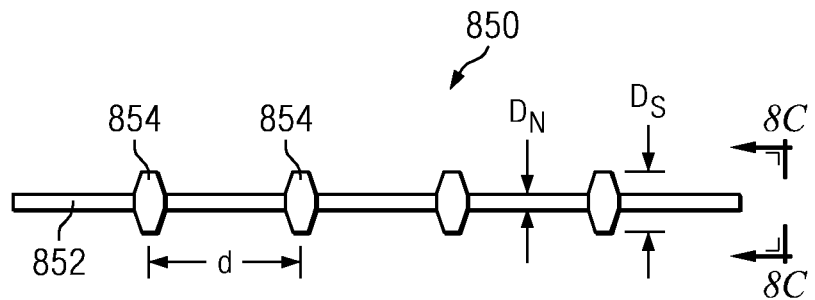

Referring now to FIGS. 8A and 8B, there are illustrated stand-off assemblies having integral filament-formed stand-offs. FIG. 8A illustrates a looped configuration and FIG. 8B illustrates a variable-thickness configuration. Referring first to FIG. 8A, a stand-off assembly 800 is shown comprising a filament 802 configured to form a series of loops 804 at predetermined positions. Each loop 804 includes at least one crossing point 806 at which the filament 802 crosses over itself. This crossing point 806 forms the actual stand-off element. For a filament 802 having a given nominal diameter (denoted "D"), at the crossing point 806 the stand-off element will have a height (denoted "H") equal to 2×D, i.e., twice the nominal diameter of the filament itself. Accordingly, when used in a VIGU, the pane-spacing distance (gap) will be maintained at approximately 2×D, i.e., twice the diameter of the filament 802, minus a known and prescribed amount of deformation of the filament at its prescribed crossing point.

Figure 8C:
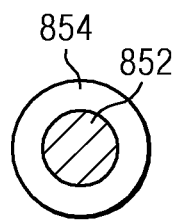
FIGS. 8C-8E are end views of alternative stand-off assemblies. Namely.
Figure 8D:
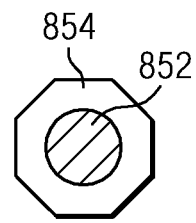
Figure 8E:
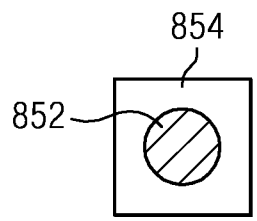

Referring now to FIGS. 8B-8C, there is illustrated a stand-off assembly having a variable-thickness configuration with a substantially round cross-section. Stand-off assembly 850 includes a filament 852 having a series of integral stand-off elements 854 formed from the filament itself Each integral stand-off element 854 is a longitudinally localized area having a predetermined thickness that is greater than the thickness of the adjacent area of the filament, and occurs at predetermined locations along the length of the filament 852 (i.e., spaced apart distance "d"). The integral stand-off elements 854 may be created by known wire-forming methods such as drawing, stamping, cold-forming, etc. In the embodiment shown, the filament 852 has a nominal diameter, denoted $D_N$, and the longitudinally localized areas have a diameter, denoted Ds, that is larger than $D_N$. FIGS. 8D and 8E show alternative embodiments, similar to that shown in FIGS. 8A-8C, wherein the integral stand-off elements 854 have octagonal and rectangular cross-sections, respectively.

Figure 9A:
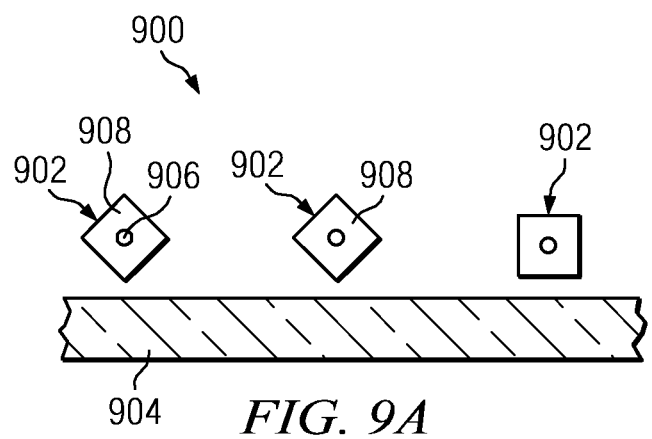
Figure 9B:
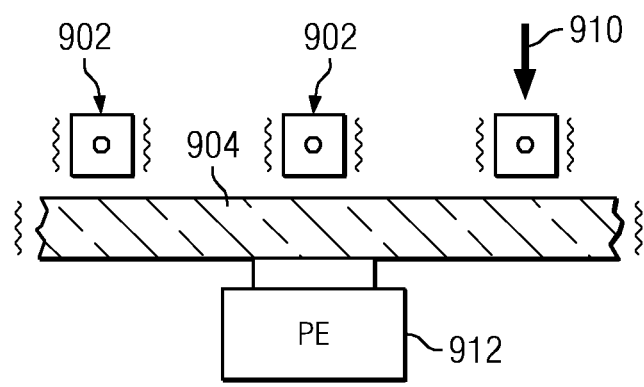
Figure 9C:
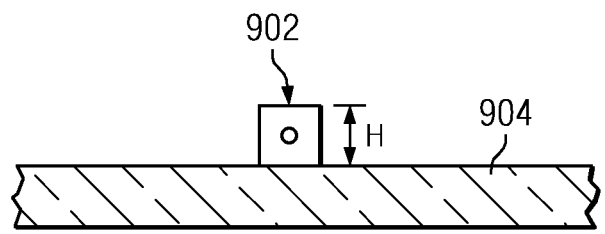

In cases where the stand-off elements do not have a circular cross-section when viewed along the filament axis, it may be necessary to ensure that the stand-off elements lie on the panes of the VIGU with a particular orientation. Preferably, the orientation of all stand-off elements on a particular stand-off assembly or stand-off array unit may be accomplished simultaneously. Referring now to FIGS. 9A-9B, one method for orienting non-symmetrical stand-off elements is shown. Referring first to FIG. 9A, a stand-off array unit 900, including three stand-off assemblies 902, is shown positioned over one pane 904 of a VIGU. Each stand-off assembly 902 includes a filament 906 and a plurality of stand-off elements 908. Since this is an end view, it will be appreciated that only one stand-off element 908 is shown for each assembly 902. Initially, the filaments 906 are positioned over the pane 904 high enough to ensure that the stand-off elements 908 are not yet touching the pane surface. This may be accomplished, e.g., by pulling the anchors (not shown) apart from one another to produce a prescribed tension in the filaments 906. While the stand-off elements 908 are not yet touching the pane surface, a prescribed dither signal is imposed on the pane 904 or applied to the stand-off array unit 900. As seen in FIG. 9B, the dither signal may be produced by a signal generator 912 in contact with the pane 904 or array unit 900. It will be understood that the dither signal causes the components to vibrate with a predetermined magnitude. The stand-off array units 902 are lowered (denoted by arrow 910) toward the pane 904 while the prescribed dither signal is continuously imposed on the pane or array unit 900. The stand-off elements 908 will rotate under the influence of the dither signal until they achieve their most stable position, i.e., typically with the broadest or least-curved surface facing the pane. As shown in FIG. 9C, once the stand-off elements 908 have achieved their desired stable orientation, the dither signal is discontinued, and the stand-off array unit 900 is fixed into place with respect to pane 904.

Figure 10:
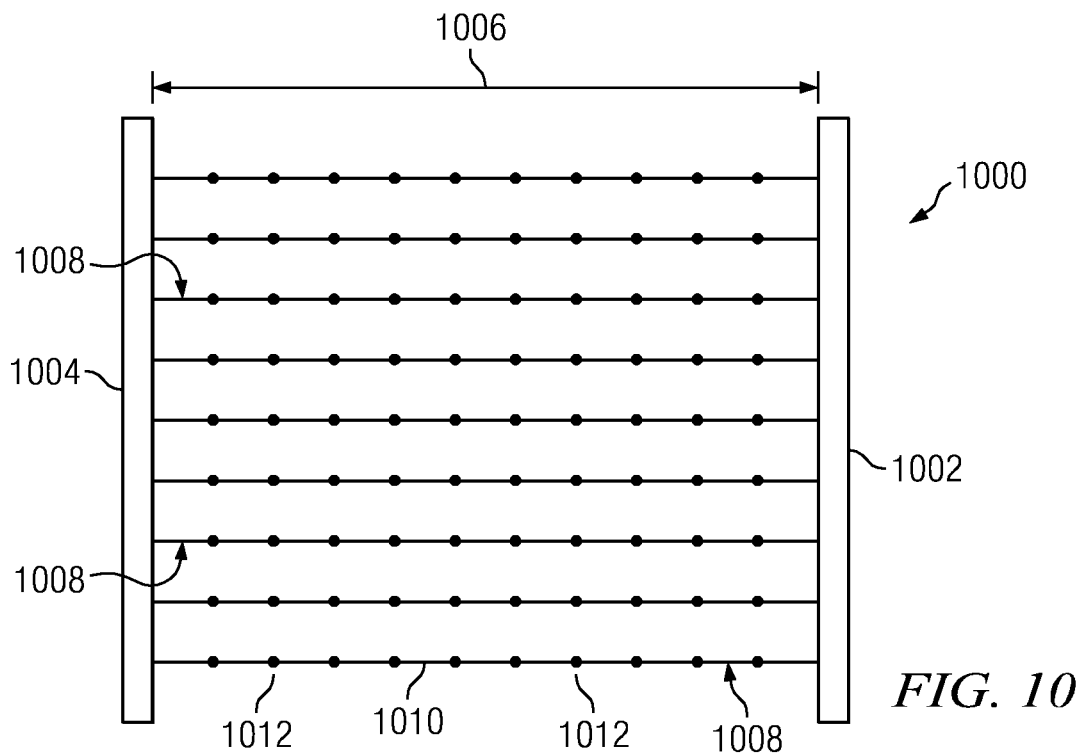
FIG. 10 illustrates a stand-off array unit including multiple stand-off assemblies attached between anchor elements in accordance with another aspect.

Referring now to FIG. 10, there is illustrated a stand-off array unit for a VIGU in accordance with another embodiment. Stand-off array unit 1000 includes anchors 1002 and 1004 spaced apart from one another a distance denoted by 1006 corresponding to the distance between the opposite edges of one pane of the VIGU. A plurality of stand-off assemblies 1008 are connected between anchors 1002 and 1004 in a substantially parallel arrangement. Each stand-off assembly 1008 includes a filament 1010 and a plurality of stand-off elements 1012 positioned on the filament at predetermined positions. The stand-off elements 1012 may be separately-formed elements that have been affixed to the filament 1010, integral elements formed from loops or other deformations of the filament itself, or a combination of both. The stand-off elements 1012 have a height equal to the nominal predetermined height of the gap between the panes (not shown) of the finished VIGU. In some embodiments, the predetermined height of the gap may include factors to compensate for dimensional tolerances of the panes such as roller wave distortion, etc.

Figure 11:
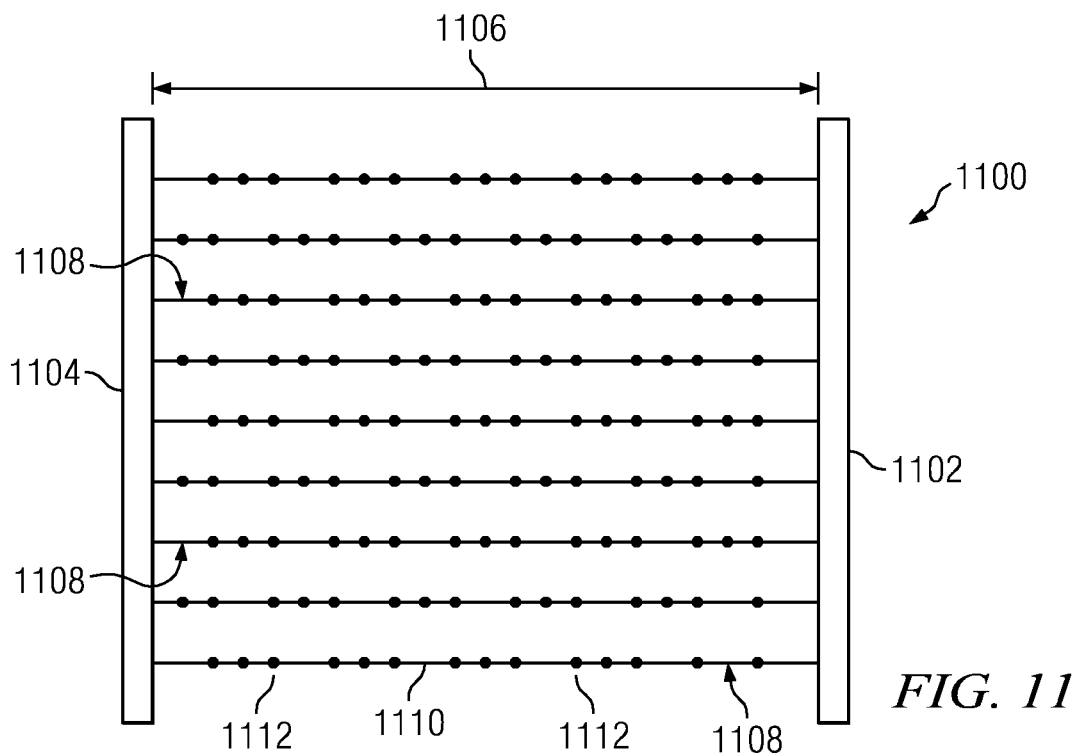
FIG. 11 illustrates a stand-off array unit including multiple stand-off assemblies attached between anchor elements having a different stand-off pattern in accordance with another aspect.

Referring now to FIG. 11, there is illustrated a stand-off array unit 1100 including multiple stand-off assemblies 1108 attached between anchor elements 1102 and 1104 having a different stand-off pattern in accordance with another aspect. In this embodiment, extra stand-off elements 1112 are provided at selected positions to provide a different support structure.

Figure 12:
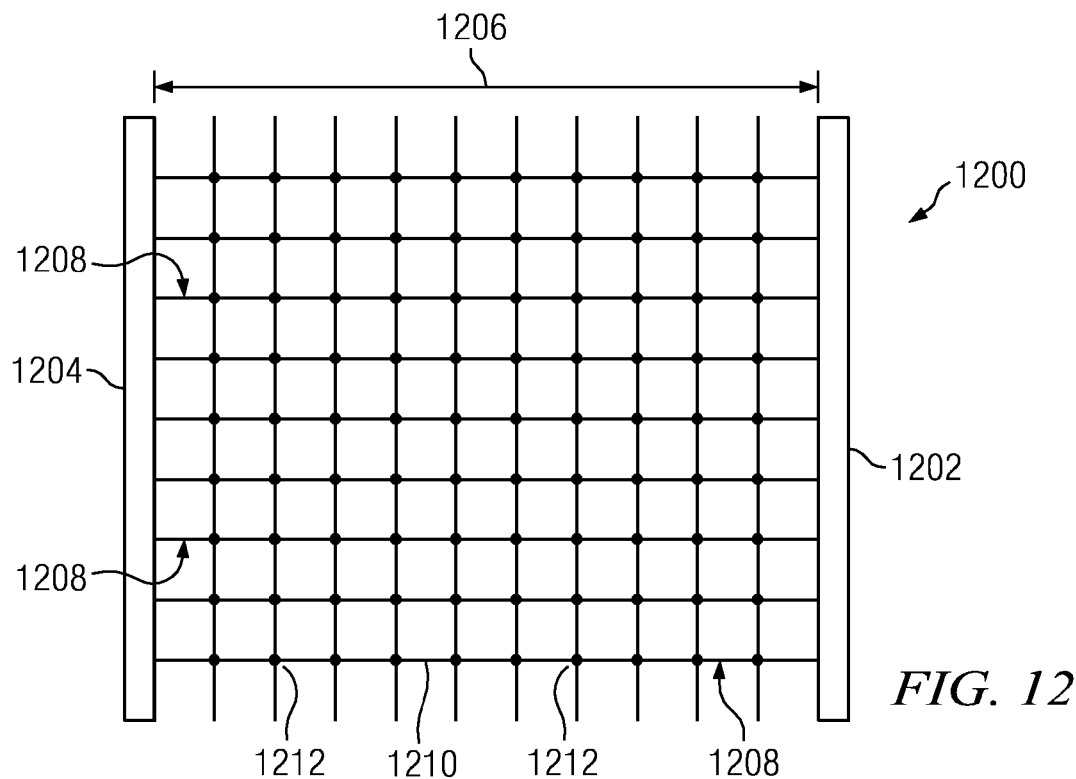
FIG. 12 illustrates a stand-off array unit including multiple stand-off assemblies attached between anchor elements on filaments running in a crossing pattern in accordance with another aspect.

Referring now to FIG. 12, there is illustrated a stand-off array unit 1200 including multiple stand-off assemblies 1208 attached between anchor elements 1202 and 1204 on filaments 1210 running in a crossing pattern in accordance with another aspect. In the illustrated embodiment, the filaments 1210 cross at right angles, but other crossing angles may be used in other embodiments. The individual stand-off elements 1212 may be strung on one filament 1210, or on both filaments at each "intersection" of filaments, depending on the properties desired for the embodiment. Also, additional anchor elements (not shown) may be provided for the crossing filaments in some embodiments. In other embodiments, no anchor elements 1202, 1204 are used, rather, the filaments are secured to the edge seals as described in FIGS. 2C and 2D.

Figure 13:
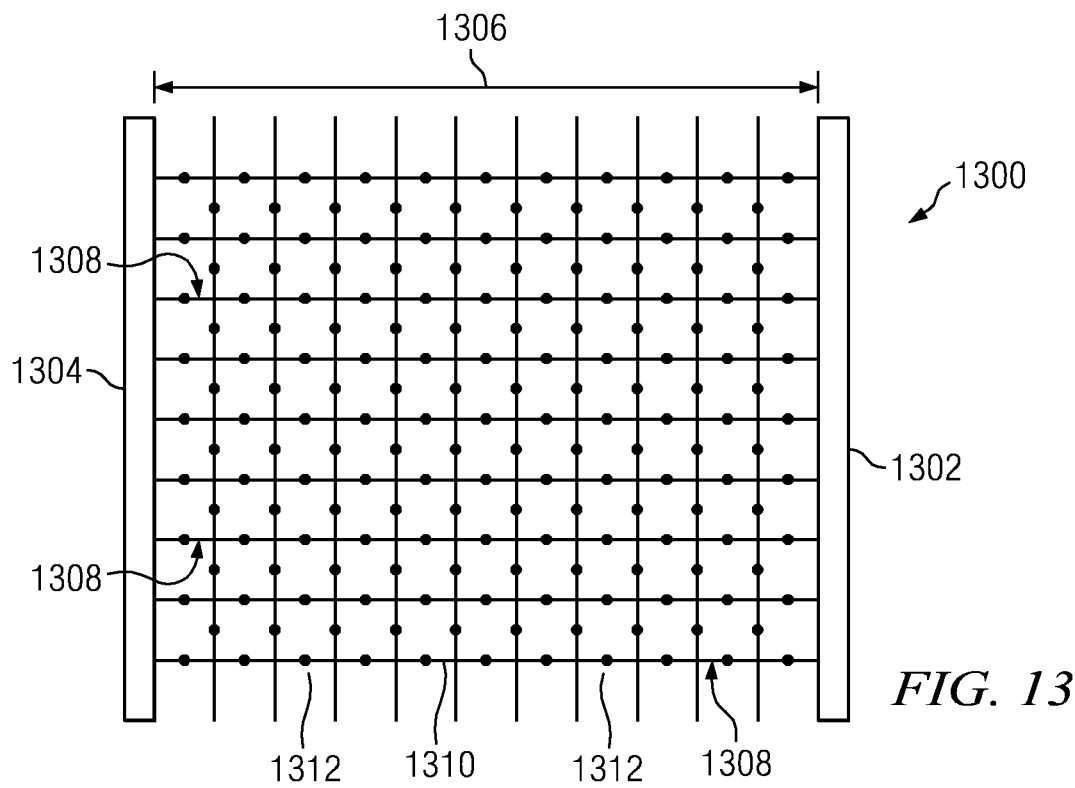
FIG. 13 illustrates another stand-off array unit including multiple stand-off assemblies attached between anchor elements on filaments running in a crossing pattern in accordance with another aspect.

Referring now to FIG. 13, there is illustrated a stand-off array unit 1300 including multiple stand-off assemblies 1308 attached between anchor elements 1302, 1304 on filaments 1310 running in a crossing pattern. In this embodiment, the stand-off elements 1312 are affixed to the filaments 1310 at location other than at the "intersections." Accordingly, the stand-off elements 1312 may be strung on only one filament 1310.

It will be appreciated by those skilled in the art having the benefit of this disclosure that these filament-strung stand-off elements provide vacuum insulated glazing units with improved thermal performance. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A vacuum insulating glazing unit (VIGU) comprising:
   first and second panes of transparent material, each pane having edges and inner and outer faces, the panes disposed with inner faces substantially opposing one another and separated by a gap having a predetermined height;
   first and second anchors, the anchors being disposed at the opposite edges of one pane of the VIGU;
   a plurality of filaments, each filament attached at one end to the first anchor and at the other end to the second anchor, the filaments collectively disposed between the panes and substantially parallel to one another;
   a plurality of stand-offs, the stand-off elements being affixed to each filament at predetermined positions along the filament, the stand-off elements having a height substantially equal to the predetermined height of the gap such that the stand-off elements touch the inner surfaces of the panes; and
   seals disposed about the edges of the panes and enclosing the stand-off elements within a volume between the panes from which the atmosphere may be evacuated to form a partial vacuum.

2. A VIGU in accordance with claim 1, wherein the filaments have a nominal diameter within the range from 0.0002 inches to 0.002 inches.

3. A VIGU in accordance with claim 2, wherein the filaments have a nominal diameter of 0.001 inches or less.

4. A VIGU in accordance with claim 2, wherein the filaments are wires formed of a material selected from the group consisting of stainless steel, controlled-expansion metal alloys, inconel, brass, bronze, copper and titanium.

5. A VIGU in accordance with claim 2, wherein the filaments are formed of a glass material.

6. A VIGU in accordance with claim 1, wherein the outer surface of the filaments have a reflectance-reducing coating.

7. A VIGU in accordance with claim 1, wherein the individual stand-off elements have a maximum projected shape, when viewed normal to the transparent panes, that can be contained within a circle having a diameter within the range from 0.004 inches to 0.018 inches.

* * * * *